Figure 3:
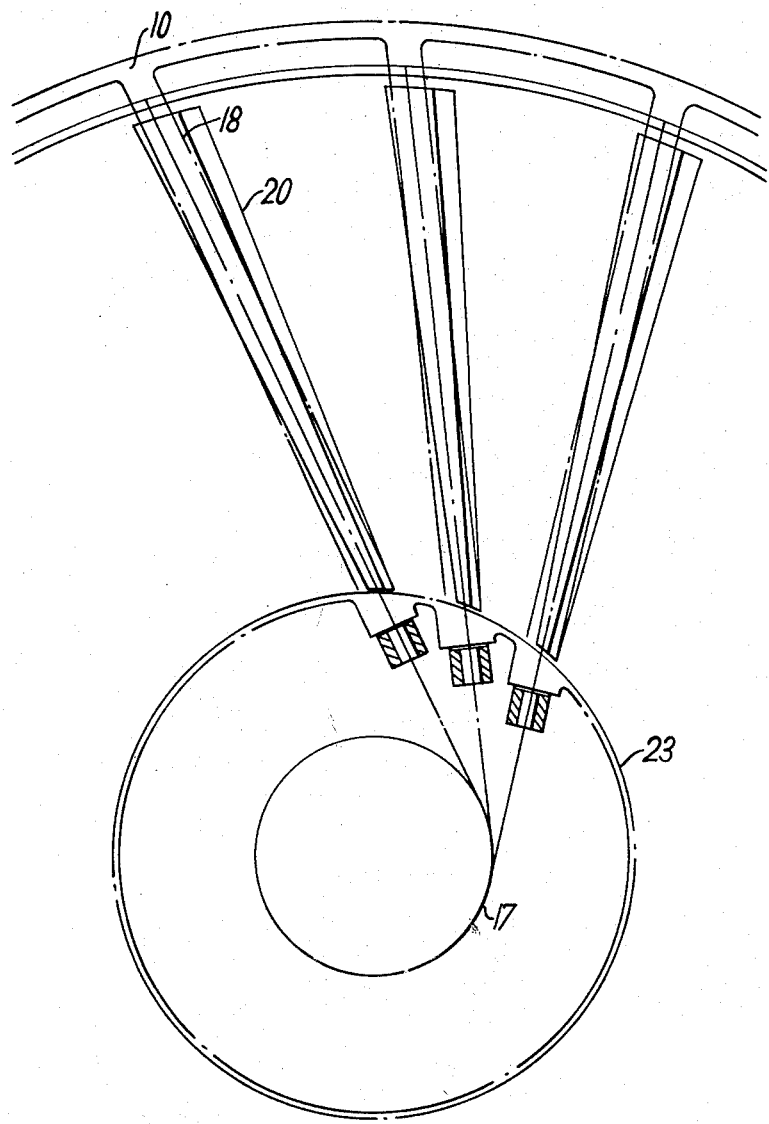

Dec. 10, 1963    R. D. BEALE ETAL    3,113,430
GAS TURBINE ENGINE
Filed Feb. 8, 1962    2 Sheets-Sheet 1
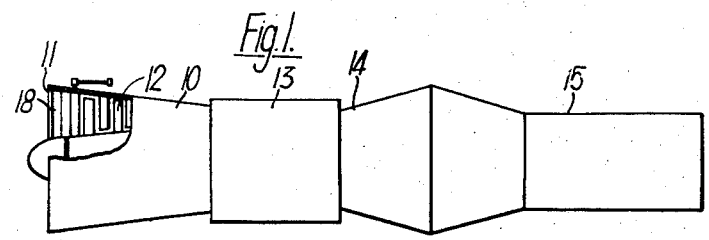
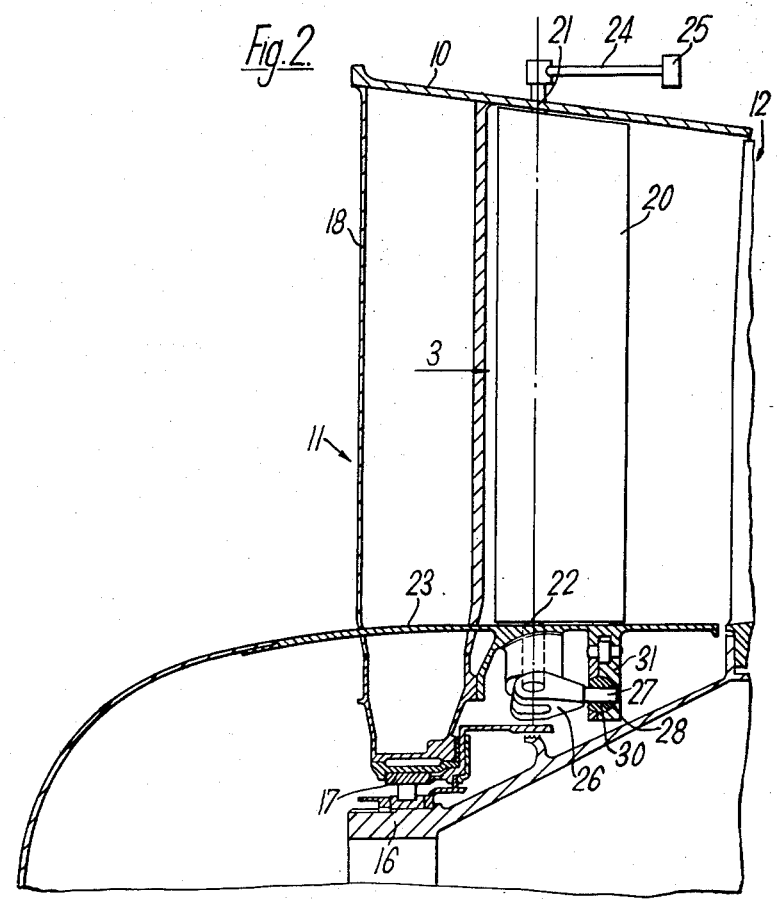
Inventors
Richard Derby Beale
Frank Littleford
By
Cushman, Darby & Cushman
Attorneys Dec. 10, 1963 R. D. BEALE ETAL 3,113,430
GAS TURBINE ENGINE
Filed Feb. 8, 1962 2 Sheets-Sheet 2

Inventors
Richard Derby Beale
Frank Littleford
By
Cushman, Darby & Cushman
Attorneys

United States Patent Office 3,113,430
Patented Dec. 10, 1963

3,113,430
GAS TURBINE ENGINE
Richard Derby Beale, Derby, and Frank Littleford, Little-
Eaton, Derby, England, assignors to Rolls-Royce Lim-
ited, Derby, England, a company of Great Britain
Filed Feb. 8, 1962, Ser. No. 171,868
Claims priority, application Great Britain Feb. 22, 1961
7 Claims. (Cl. 60—39.31)

This invention concerns a gas turbine engine.

According to the present invention, there is provided a gas turbine engine comprising an engine casing, a housing mounted within said casing, rotatable shafting mounted within said housing and supporting compressor means of the engine, a plurality of struts which are disposed upstream of the compressor means and which extend from the casing so as to support the housing, said struts extending tangentially of said housing, and a plurality of inlet guide vanes disposed between said struts and said compressor means, said inlet guide vanes extending substantially parallel to said struts.

The said housing may be constituted by a bearing or, alternatively may constitute a housing for a bearing.

It will be appreciated that the tangential disposition of the struts with respect to the said housing diminishes the risk of buckling if differential expansion or contraction should occur of the various struts. It will also be appreciated that, by virtue of arranging the inlet guide vanes parallel to the struts, the inlet guide vanes are prevented from blocking the air flow from the struts to the compressor means of the engine.

Preferably the number of inlet guide vanes which are provided is equal to or a whole multiple of the number of struts.

The inlet guide vanes are preferably pivotally mounted and power means are provided for adjusting the angular position of the inlet guide vanes.

Thus the inlet guide vanes may be connected to a rotatable vane operating ring rotation of which effects angular adjustment of the inlet guide vanes.

The said power means are preferably connected to one or more of the inlet guide vanes so as to be adapted to adjust the position of the latter, such adjustment effecting rotation of said vane operating ring and hence of the remaining inlet guide vanes.

The invention is illustrated, merely by way of example, in the accompanying drawings, in which:

FIGURE 1 is a diagrammatic side view of a gas turbine engine according to the present invention, FIGURE 2 is a section showing part of the gas turbine engine of FIGURE 1, and FIGURE 3 is a cross-section looking in the direction of the arrow 3 of FIGURE 2.

Referring to the drawings, a gas turbine engine, which has an engine casing 10, comprises in flow series an air intake 11, a compressor 12, combustion equipment 13 and a turbine 14, the turbine exhaust gases being directed to atmosphere through a jet pipe 15.

The compressor 12 and turbine 14 are mounted on a common rotatable shaft 16 (FIG. 2) whose upstream end is journalled within a bearing 17.

Extending across the air intake 11, upstream of the compressor 12, are a plurality of angularly spaced apart intake struts 18 by means of which the bearing 17 is supported from the engine casing 10. Each of the intake struts 18 is hollow, has a cross-section of aerofoil shape, and extends tangentially of the bearing 17. This tangential disposition of the intake struts 18 with respect to the bearing 17 diminishes the risk of buckling if differential expansion and contraction of the various intake struts 18 occurs.

A plurality of angularly spaced apart inlet guide vanes 20 are disposed between the intake struts 18 and the compressor 12. Each of the inlet guide vanes 20 is mounted on pivots 21, 22 which are respectively mounted in the engine casing 10 and in a bullet shaped inner casing 23. As will be clearly seen from FIGURE 3, each of the inlet guide vanes 20 extends substantially parallel to an intake strut 18.

The number of inlet guide vanes 20 is shown as being equal to the number of intake struts 18 and this is the preferred arrangement. If desired, however, the number of inlet guide vanes may be a whole multiple of the number of intake struts.

The pivot 21 of one or more of the inlet guide vanes 20 is connected by a crank 24 to a pneumatically or hydraulically operable ram 25. The pivot 22 of the said inlet guide vane 20 is mounted between and secured to the limbs of a forked member 26 having an axially extending pin 27.

The pin 27 is slidably mounted in a hole 28 provided in a part-spherical member 30. The member 30 is mounted with a correspondingly shaped recess in a vane operating ring 31 which is journalled within the casing 23. The vane operating ring 31 is connected by forked members 26 to the remaining inlet guide vanes 20.

Accordingly, when the ram 25 is actuated to effect angular adjustment of the inlet guide vane 20 to which it is connected, such adjustment causes rotation of the vane operating ring 31 and hence causes corresponding annular adjustment of the remaining inlet guide vanes 20.

By reason of the fact that the inlet guide vanes 20 are disposed substantially parallel to the intake struts 18, the inlet guide vanes 20 do not block the air flow from the intake struts 18 to the compressor 12.

We claim:

1. A gas turbine engine comprising an engine casing, compressor means, combustion equipment and turbine means arranged in flow series in said engine casing, a housing mounted within said casing, rotatable shafting mounted within said housing, said compressor means being supported by said shafting, a plurality of struts which are disposed upstream of the compressor means and which extend from the casing so as to support the housing, said struts extending tangentially of said housing, and a plurality of inlet guide vanes disposed between said struts and said compressor means, each of said inlet guide vanes having a forward edge extending substantially parallel to and disposed in the lee of a respective one of said struts.

2. A gas turbine engine comprising an engine casing, compressor means, combustion equipment and turbine means arranged in flow series in said engine casing, a housing mounted within said casing, rotatable shafting mounted within said housing, said compressor means being supported by said shafting, a plurality of struts which are disposed upstream of the compressor means and which extend from the casing so as to support the housing, said struts extending tangentially of said housing, a plurality of inlet guide vanes which are pivotally mounted in said casing and are disposed between said struts and said compressor means, each of said inlet guide vanes having a forward edge extending substantially parallel to and disposed in the lee of a respective one of said struts, and power means for adjusting the angular position of the inlet guide vanes.

3. A gas turbine engine comprising an engine casing, compressor means, combustion equipment and turbine means arranged in flow series in said engine casing, a housing mounted within said casing, rotatable shafting mounted within said housing, said compressor means being supported by said shafting, a plurality of struts which are disposed upstream of the compressor means and which extend from the casing so as to support the housing, said struts extending tangentially of said housing, a plurality of inlet guide vanes which are pivotally mounted in said casing and are disposed between said struts and said compressor means, each of said inlet guide vanes having a forward edge extending substantially parallel to and disposed in the lee of a respective one of said struts, a rotatable vane operating ring rotation of which effects angular adjustment of the inlet guide vanes, and power means for rotating the vane operating ring.

4. A gas turbine engine comprising an engine casing, compressor means, combustion equipment and turbine means arranged in flow series in said engine casing, a housing mounted within said casing, rotatable shafting mounted within said housing, said compressor means being supported by said shafting, a plurality of struts which are disposed upstream of the compressor means and which extend from the casing so as to support the housing, said struts extending tangentially of said housing, a plurality of inlet guide vanes which are pivotally mounted in said casing and which are disposed between said struts and said compressor means, each of said inlet guide vanes having a forward edge extending substantially parallel to and disposed in the lee of respective one of said struts, power means connected to at least one of the inlet guide vanes to the angular position thereof, and a rotatable vane operating ring connected to all the inlet guide vanes and rotated upon adjustment of the angular position of the said at least one inlet guide vane, rotation of said vane operating ring effecting rotation of the remaining inlet guide vanes.

5. A gas turbine engine comprising an engine casing, compressor means, combustion equipment and turbine means arranged in flow series in said engine casing, a housing mounted within said casing, rotatable shafting mounted within said housing, said compressor means being supported by said shafting, a plurality of struts which are disposed upstream of the compressor means and which extend from the casing so as to support the housing, said struts extending tangentially of said housing, and a plurality of inlet guide vanes disposed between said struts and said compressor means, each of said inlet guide vanes having a forward edge extending substantially parallel to and disposed in the lee of a respective one of said struts, the number of inlet guide vanes being equal to the number of struts.

6. A gas turbine engine having a main fluid duct, and comprising an engine casing surrounding said main fluid duct, compressor means, combustion equipment and turbine means arranged in flow series in said main fluid duct, a housing disposed coaxially within and spaced from said casing, said housing and casing defining therebetween a forward portion of said main fluid duct, a bearing mounted coaxially within said housing, rotatable shafting mounted within said bearing, said compressor means being supported by said shafting, a plurality of struts disposed upstream of the compressor means and crossing said main fluid duct, said struts interconnecting said casing and said housing and extending tangentially of said bearing, and a plurality of compressor inlet guide vanes crossing said main fluid duct and disposed immediately downstream of said struts, each of said inlet guide vanes having a forward edge extending parallel to and disposed in the lee of a respective one of said struts.

7. A gas turbine engine as claimed in claim 6 in which each of said inlet guide vanes is pivotally mounted about an axis extending parallel to and closely adjacent the forward edge thereof.

References Cited in the file of this patent
UNITED STATES PATENTS

| | | |
|---|---|---|
| 2,388,208 | Foss | Oct. 30, 1945 |
| 2,616,662 | Mierley | Nov. 4, 1952 |
| 2,793,804 | Woodbury | May 28, 1957 |
| 2,857,092 | Campbell | Oct. 21, 1958 |
| 2,914,241 | Novak | Nov. 24, 1959 |
| 2,929,546 | Wilkes | Mar. 22, 1960 |
| 2,936,999 | Coar | May 17, 1960 |

FOREIGN PATENTS

| | | |
|---|---|---|
| 882,330 | France | May 31, 1943 |